(12) United States Patent
Zhang et al.

(10) Patent No.: US 12,166,586 B2
(45) Date of Patent: Dec. 10, 2024

(54) METHODS, APPARATUSES, AND MEDIA FOR OPERATING POINT-TO-MULTIPOINT RADIO BEARER

(71) Applicant: Lenovo (Beijing) Limited, Beijing (CN)

(72) Inventors: Congchi Zhang, Shanghai (CN); Mingzeng Dai, Shanghai (CN); Lianhai Wu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 18/250,068

(22) PCT Filed: Oct. 22, 2020

(86) PCT No.: PCT/CN2020/122992
§ 371 (c)(1),
(2) Date: Apr. 21, 2023

(87) PCT Pub. No.: WO2022/082666
PCT Pub. Date: Apr. 28, 2022

(65) Prior Publication Data
US 2023/0396368 A1 Dec. 7, 2023

(51) Int. Cl.
*H04L 1/1607* (2023.01)
*H04L 1/00* (2006.01)
(Continued)

(52) U.S. Cl.
CPC .......... *H04L 1/1657* (2013.01); *H04L 1/1835* (2013.01); *H04L 43/16* (2013.01); *H04L 2001/0093* (2013.01)

(58) Field of Classification Search
None
See application file for complete search history.

(56) References Cited

U.S. PATENT DOCUMENTS 9,961,599 B2 * 5/2018 Sane ..................... H04L 1/1685
2006/0178918 A1 8/2006 Mikurak
(Continued)

FOREIGN PATENT DOCUMENTS

CN 102104464 A 6/2011
CN 110708723 A 1/2020
(Continued)

OTHER PUBLICATIONS

PCT/CN2020/122992, "International Preliminary Report on Patentability", PCT Application No. PCT/CN2020/122992, May 4, 2023, 5 pages.
(Continued)

*Primary Examiner* — Guerrier Merant
(74) *Attorney, Agent, or Firm* — FIG. 1 Patents (57) ABSTRACT

Embodiments of the present disclosure provide a solution for operating radio bearers. According to embodiments of the present disclosure, a terminal device monitors a plurality of data packets transmitted from a network device on a radio bearer. If a reception of at least one data packet in the plurality of data packets is failed, the terminal device is able to discard the at least one data packet without requesting retransmission. The network device determines whether a
(Continued)

retransmission condition for the at least one data packet is unfulfilled. If the retransmission condition is unfulfilled, the retransmission of the at least one data packet is skipped.

20 Claims, 7 Drawing Sheets

(51) Int. Cl.
*H04L 1/1829* (2023.01)
*H04L 43/16* (2022.01)

(56) References Cited

U.S. PATENT DOCUMENTS

| | | | |
|---|---|---|---|
| 2014/0140265 A1 | 5/2014 | Zhang et al. | |
| 2015/0078160 A1* | 3/2015 | Rankin | H04L 47/193 370/231 |
| 2016/0087866 A1* | 3/2016 | Modai | H04L 47/30 709/231 |
| 2018/0359811 A1 | 12/2018 | Verzun et al. | |
| 2020/0344629 A1* | 10/2020 | Kim | H04W 48/16 |
| 2021/0105675 A1* | 4/2021 | Kim | H04W 76/27 |
| 2022/0394581 A1* | 12/2022 | Kim | H04W 36/02 |
| 2023/0007527 A1* | 1/2023 | Baek | H04W 28/0268 |

FOREIGN PATENT DOCUMENTS

| | | | |
|---|---|---|---|
| CN | 111726205 A | 9/2020 | |
| EP | 1868311 B1 | 6/2006 | |
| WO | WO-2007050231 A2 * | 5/2007 | ........... H04L 1/0026 |
| WO | 2007144041 A1 | 12/2007 | |
| WO | WO-2018202190 A1 * | 11/2018 | ........... H04L 1/1642 |
| WO | WO-2022025528 A1 * | 2/2022 | ........... H04W 12/033 |
| WO | 2022085640 A1 | 4/2022 | |
| WO | 2022085664 A1 | 4/2022 | |

OTHER PUBLICATIONS

PCT/CN2020/122992, "International Search Report and Written Opinion", PCT Application No. PCT/CN2020/122992, Jul. 14, 2021, 6 pages.
202080106558.1, "Foreign Office Action", CN Application No. 202080106558.1, Jul. 30, 2024, 24 pages.
20958248.5, "European Search Report", Application No. 20958248.5, Jul. 11, 2024, 9 pages.

* cited by examiner

METHODS, APPARATUSES, AND MEDIA FOR OPERATING POINT-TO-MULTIPOINT RADIO BEARER

TECHNICAL FIELD

Embodiments of the present disclosure generally relate to the field of telecommunication, and in particular, to methods, apparatuses, and media for operating point-to-multipoint (PTM) radio bearers.

BACKGROUND

With development of communication technologies, several solutions have been proposed to provide efficient and reliable solutions for communication. For example, Multicast and Broadcast Service (MBS) has been proposed to make it possible for efficient use of radio and network resources while transmitting audio and video content to a large group of end users. In a scenario of the MBS, both point-to-point (PTP) and PTM are supported when a base station transmits MBS data packets in downlink. PTP mode means that packets are sent in downlink using unicast to a specific terminal device with a Cell-Radio Network Temporary Identity (C-RNTI). PTM mode means that the packets are sent in downlink using multicast to a group of terminal devices sharing a common Group-Radio Network Temporary Identity (G-RNTI). Solutions on improving performances of MBS need to be further studied.

SUMMARY

In general, example embodiments of the present disclosure provide a solution for operating PTM radio bearers.

In a first aspect, there is provided a method performed by a terminal device. The method comprises monitoring a plurality of data packets received from a network device on a first radio bearer; determining a reception failure of at least one data packet of the plurality of data packets; determining whether a retransmission condition for the at least one data packet is unfulfilled; and in accordance with a determination that the retransmission condition is unfulfilled, discarding the at least one data packet without requesting retransmission.

In a second aspect, there is provided a method performed by a network device. The method comprises transmitting, to a terminal device, a plurality of data packets on a first radio bearer; determining whether a retransmission condition for at least one data packet of the plurality of data packets is unfulfilled; and in accordance with a determination that the retransmission condition is unfulfilled, causing a retransmission of the at least one data packet to be skipped.

In a third aspect, there is provided an apparatus. The apparatus includes a processor; and a memory coupled to the processor and storing instructions thereon, the instructions, when executed by the processor, causing the apparatus to perform the method according to the first aspect.

In a fourth aspect, there is provided an apparatus. The apparatus includes a processor; and a memory coupled to the processor and storing instructions thereon, the instructions, when executed by the processor, causing the apparatus to perform the method according to the second aspect.

In a fifth aspect, there is provided a computer readable medium having instructions stored thereon, the instructions, when executed on at least one processor, causing the at least one processor to carry out the method according to the first aspect.

In a sixth aspect, there is provided a computer readable medium having instructions stored thereon, the instructions, when executed on at least one processor, causing the at least one processor to carry out the method according to the second aspect.

Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" refers to a device which is capable of providing or hosting a cell or coverage where terminal devices can communicate. Examples of a network device include, but not limited to, a Node B (NodeB or NB), an Evolved NodeB (eNodeB or eNB), a NodeB in new radio access (gNB) a Remote Radio Unit (RRU), a radio head (RH), a remote radio head (RRH), a low power node such as a femto node, a pico node, a satellite network device, an aircraft network device, and the like. For the purpose of discussion, in the following, some example embodiments will be described with reference to eNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices or evolved MTC (eMTC) devices, devices on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. In the following description, the terms "terminal device", "communication device", "terminal", "user equipment" and "UE" may be used interchangeably.

Communication discussed herein may conform to any suitable wireless interface standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, such communication may be performed according to any communication protocol either currently known or to be developed in the future. Examples of the communication protocols include, but are not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

Figure 1:
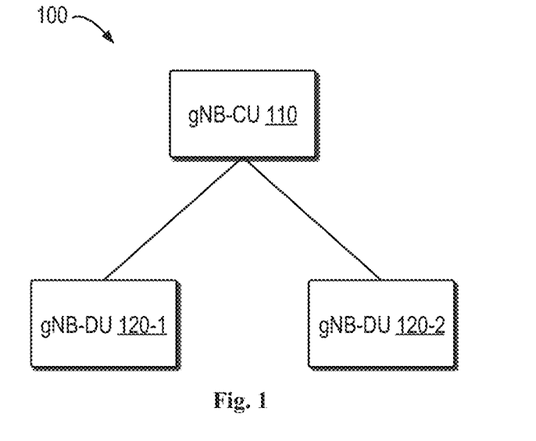
FIG. 1 illustrates a Radio Access Network (RAN) architecture of Central Unit-Distributed Unit (CU-DU) split system according to conventional technologies.

As mentioned above, the MBS has been proposed. In Release 17, the New Radio (NR) support of MBS has been agreed. For example, it has been agreed to use conventional Next-Generation Radio Access Network (NG-RAN) architecture to support NR MBS. As shown in FIG. 1, in the conventional NG-RAN architecture 100, the gNB structure is split into two parts called gNB-CU 110 and gNB-DUs 120-1 and 120-2. The gNB-CU 110 and the gNB-DUs 120-1 and 120-2 are connected by an interface called F1. The Radio Resource Control (RRC), Service Data Adaptation Protocol (SDAP) and Packet Data Convergence Protocol (PDCP) layers are in the gNB-CU 110 and the gNB-DUs (for example, the 120-1 and 120-2) hold the Radio Link Control (RLC), Media Access Control and Physical (PHY) layers functionalities.

Further, in order to support PTM transmission of high reliability, RLC Acknowledge Mode (AM) can be adopted for PTM multicast data radio bearers (DRBs). Since a terminal device may trigger a RLC status report in case of RLC Protocol Data Unit (PDU) loss. One way to realize Automatic Repeat-reQuest (ARQ) for RLC AM PTM DRB is that the network device keeps retransmitting the lost data packet(s) until all associated terminal devices have received it successfully. However, on the other hand, if one terminal device in the group faces poor link condition and always fails to receive the data packet(s), it's unreasonable to keep RLC retransmission while the newly generated RLC Service Data Units (SDUs) are pending since the RLC transmission window is bounded by the last in-sequence acknowledged RLC SDU Sequence Number (SN) plus a TX_Window_Size. It may cause waste of transmission resources and increase latency. Therefore, a new solution regarding retransmission of lost data packets is needed to avoid resource wastes.

Moreover, there are problems in initialization of the RLC and PDCP state variables for PTM DRBs. In the legacy, most of the RLC and PDCP state variables for uplink and downlink are initialized to 0. However, for MBS service, a terminal device may join an ongoing MBS session (i.e. the network device has already established a PTM DRB and has been transmitting MBS data packet in downlink for some time), then the first received RLC/PDCP SDU may not be 0 anymore. With initialized value to be 0, there may be problem for the state variable maintenance in PTM DRBs. Thus, initiation of state variables for MBS is also needed to be studied.

Embodiments of the present disclosure provide a solution for operating PTM radio bearers. According to embodiments of the present disclosure, a terminal device monitors a plurality of data packets transmitted from a network device on a first radio bearer. If a reception of at least one data packet in the plurality of data packets is failed, the terminal device is able to discard the at least one data packet without requesting retransmission. The terminal device may determine to discard the at least one data packet by itself. Alternatively, the terminal device may discard the at least one data packet if the terminal device receives a discard indication from the network device. The network device may maintain a transmitting window and determine the retransmission of the data packet to be skipped if a sequence number of the data packet requesting retransmission indicated in the status report is outside the transmitting window. In this way, it avoids retransmitting one data packet too many times.

Some example embodiments of the present disclosure will be described in detail below with reference to FIGS. 2-7.

Example Environment

Figure 2:
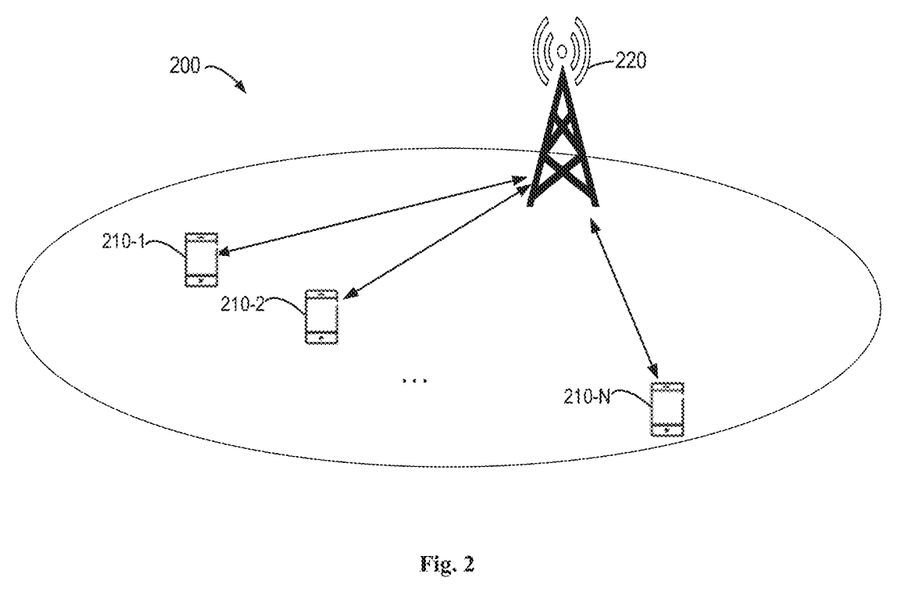
FIG. 2 illustrates a block diagram of a communication environment in which embodiments of the present disclosure can be implemented.

FIG. 2 illustrates a schematic diagram of a communication system 200 in which embodiments of the present disclosure can be implemented. The communication system 200, which is a part of a communication network, comprises a terminal device 210-1, a terminal device 210-2, . . . , a terminal device 210-N, which can be collectively referred to as "terminal device(s) 210." The number N can be any suitable integer number.

The communication system 200 further comprises a network terminal device 220. For example, the network device may be gNB. In the communication system 200, the network devices 220 and the terminal devices 210 can communicate data and control information to each other. The numbers of terminal devices and network devices shown in FIG. 2 are given for the purpose of illustration without suggesting any limitations.

Communications in the communication system 200 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

Example Processes

Figure 3:
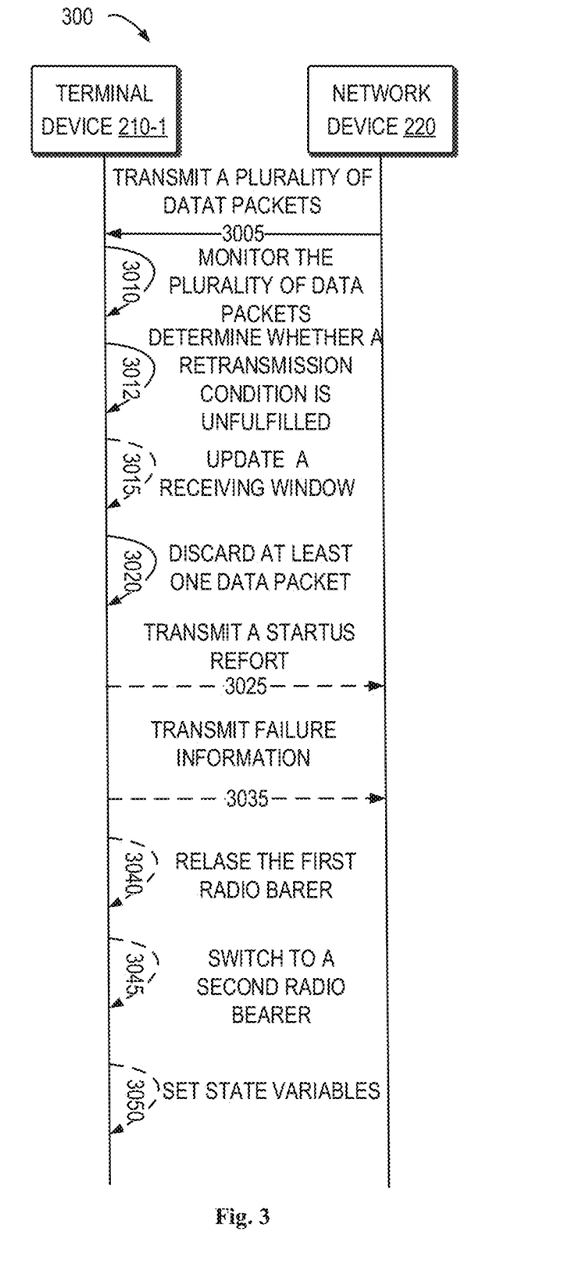
FIG. 3 illustrates a signaling chart illustrating an example process for propagation delay compensation according to some embodiments of the present disclosure.

Some example processes for propagation delay compensation will be described in detail below. Reference is now made to FIG. 3. FIG. 3 illustrates a signaling chart demonstrating an example process 300 for operating a radio bearer according to some embodiments of the present disclosure. For the purpose of this discussion, the process 300 will be described with reference to FIG. 2. The process 300 may involve the terminal device 210-1 and the network device 220 as illustrated in FIG. 2.

The network device 220 transmits 3005 a plurality of data packets on a first radio bearer to the terminal device 210-1. The first radio bearer may be a PTM radio bearer. The terminal device 210-1 monitors 3010 the plurality of data packets on the first radio bearer. For example, the network device 220 may transmit RLC PDUs on the first radio bearer. Alternatively or in addition, the RLC SDUs may be transmitted on the first radio bearer.

The terminal device 210-1 determines whether a reception failure of at least one data packet of the plurality of data packets occurs. If the reception failure occurs, the terminal device 210-1 determines 3012 whether a retransmission condition for the at least one data packet is unfulfilled. For example, the terminal device 210-1 may compare a number of reception failures of the at least one data packet with a threshold number. If the number of reception failures is below the threshold number, the retransmission condition is fulfilled. Alternatively, if the number of reception failures exceeds the threshold number, the retransmission condition is unfulfilled.

In some embodiments, the terminal device 210-1 may update 3015 a receiving window based on a SN of a next data packet following the plurality of data packets. For example, the receiving window may be bounded by [RX_NEXT_HIGHEST-AM_WINDOW_SIZE, RX_NEXT_HIGHTEST], where RX_NEXT_HIGHEST represents value of the SN following the SN of the RLC SDU with the highest SN among received RLC SDUs. If the at least one data packet falls outside the receiving window, the retransmission condition is unfulfilled. Alternatively, if the at least one data packet falls within the receiving window; the retransmission condition is fulfilled. In this way, the receiving window keeps updating regardless of the lost data packet, thereby avoiding requesting the retransmission of the lost data packet outside the receiving window.

If the retransmission condition is unfulfilled, the terminal device 210-1 discards 3020 the at least one data packet without retransmission. In some embodiments, for a give MBS session transmitting over the first radio bearer, if the reception of one or more RLC PDUs/SDUs fails consecutively, the terminal device 210-1 may discard the missing RLC PDU(s)/SDU(s) without requesting retransmission of the same RLC PDU(s)/SDU(s). In another embodiment, a RLC SDU may comprise multiple RLC PDUs. The reception of one RLC SDU fails due to the missing of one RLC PDU. In this situation, if the retransmission condition is unfulfilled, the terminal device 210-1 may discard the whole RLC SDU including those RLC PDUs that has been received so far. For example, as mentioned above, if the number of reception failures exceeds the threshold number, the at least one data packet may be discarded by the terminal device 210-1.

In other embodiments, if the at least one data packet falls outside the receiving window, the at least one data packet may be discarded by the terminal device 210-1. For example, the terminal device 210-1 may discard the data packet with the SN of the data packet smaller than RX_NEXT_HIGHEST-AM_WINDOW_SIZE while still in the buffer. In some embodiments, the network device 220 may transmit an indication to the terminal device 210-1 to discard the lost data packet before the sequence number which equals to X.

In an example embodiment, the terminal device 210-1 may update relevant state variables. For example, the parameter RX_NEXT may be updated to the value of the SN following the last in sequence completely received data packet after the discarded data packet.

The terminal device 210-1 may transmit 3025 a status report to the network device 220. In some embodiments, the status report may indicate an acknowledgment related to a set of data packets within the receiving window. In some embodiments, the acknowledgment may indicate an ACK related to the set of data packets. Alternatively, the acknowledgement may indicate a NACK related to the set of data packets. Thus, the status report of the data packet(s) out of the receiving window is not transmitted and the retransmission of the data packet(s) is skipped, thereby avoiding retransmission of the data packet(s) out of the receiving window.

In some embodiment, as mentioned above, the terminal device 210-1 may compare the number of reception failures of the at least one data packet with a threshold number. For example, the threshold number may be pre-configured at the terminal device 210-1. Alternatively, the network device 220 may transmit information indicating the threshold number to the terminal device 210-1. In an example embodiment, if the number of failures is below the threshold number for at least one data packet, the terminal device 210-1 may request retransmitting of that data packet(s). In this way, it avoids retransmitting the data packet for too many times.

Alternatively, if the number of reception failures exceeds the threshold number, failure information indicating the reception failure may be generated. The terminal device 210-1 may transmit 3035 the failure information to the network device 220. In some embodiments, the failure information may be transmitted via RRC signaling. Therefore, it avoids UE continuing to send RLC status report requesting retransmission for the same missed/lost RLC SDU or PDU.

In other embodiments, if the number of reception failures exceeds the threshold number, the terminal device 210-1 may release 3040 the first radio bearer. Alternatively, the first radio bearer may be released after the terminal device 210-1 receives an indication from the network device 220 to release the first radio bearer.

In some embodiments, the terminal device 210-1 may switch 3045 from the first radio bearer to a second radio bearer based on a configuration information. For example, if the number of reception failures exceeds the threshold number, the terminal device 210-1 may switch from the first radio bearer to the second radio bearer. Alternatively, the first radio bearer may be switched to the second radio bearer if the terminal device 210-1 receives an indication to switch. In some embodiments, the configuration of the second radio bearer may be pre-configured at the terminal device 210-1. Alternatively, the network device 220 may transmit the configuration information of the second radio bearer to the terminal device 210-1. In other embodiments, the terminal device 210-1 may request the configuration information of the second radio bearer from the network device 220. During the switch, the terminal device 210-1 may deliver SDUs associated with the plurality of data packets to a layer above the RLC layer, for example, to PDCP layer. In some embodiments, the RLC reception buffer may be cleared. In this way, the performance of the transmission can be improved.

In an example embodiment, the network device 220 may transmit to the terminal device 210-1 an indication to disable an ARQ operation. The terminal device 210-1 may disable the ARQ operation based on this indication. In this way, it avoids UE continuing to request retransmission for the same missed/lost RLC PDU.

The terminal device 210-1 may set 3050 one or more state variables based on the first received data packet of the plurality of data packets. For example, an initial RLC state of the first radio bearer may be set. Alternatively or in addition, an initial PDCP state of the first radio bearer may be set. In this way, it avoids problems in initiating the state variables to be zero.

In some embodiments, the terminal device 210-1 may initiate one or more of the followings based on the first received data packet: a receive state variable, a t-Reassembly state variable, a maximum status transmit state variable, a highest received state variable, a Unacknowledged Mode (UM) receive state variable, a UM t-Reassembly state variable, or a UM receive state variable. In other embodiments, one or more of the followings may be initiated based on the first received data packet: a first state variable indicating a count value of a next PDCP Service Data Unit (SDU) expected to be received, or a second state variable indicating a count value of the first PDCP SDU not delivered to a layer upper than the PDCP layer.

Figure 4:
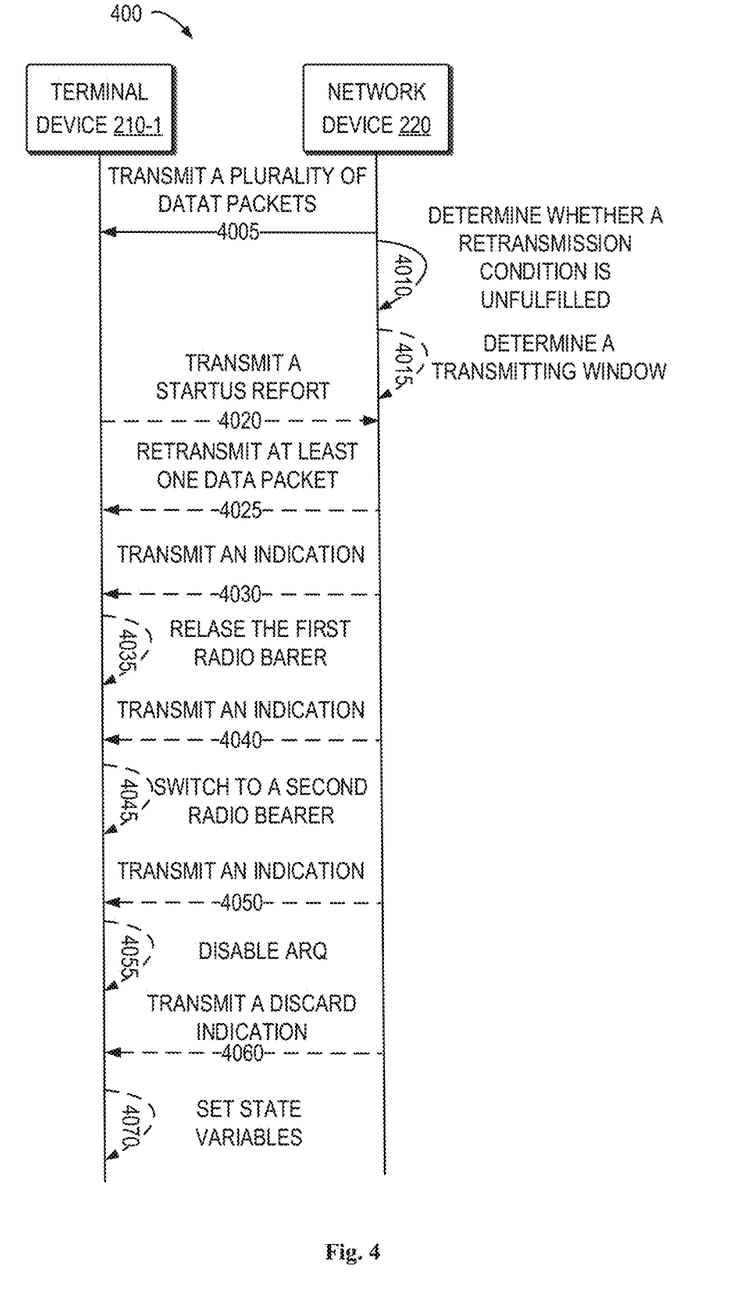
FIG. 4 illustrates a signaling chart illustrating an example process for propagation delay compensation according to some embodiments of the present disclosure.

Reference is now made to FIG. 4. FIG. 4 illustrates a signaling chart illustrating an example process 400 for propagation delay compensation according to some embodiments of the present disclosure. For the purpose of discussion, the process 400 will be described with reference to FIG. 2. The process 400 may involve the terminal device 210-1 and the network device 220 as illustrated in FIG. 2.

The network device 220 transmits 4005 a plurality of data packets on a first radio bearer to the terminal device 210-1. In some embodiments, the first radio bearer may be a PTM radio bearer. The network device 220 determines 4010 whether a retransmission condition for at least one data packet of the plurality of data packets is unfulfilled. If the retransmission conditioned is fulfilled, the at least one data packet may be retransmitted. Alternatively, if the retransmission condition is unfulfilled, the retransmission of the at least one data packet may be skipped. In this way, it avoids keeping transmitting a certain data packet for too many times.

In an example embodiment, the network device 220 may monitor failure information which is recorded by the terminal device 210-1 for a predetermined duration. The failure information may indicate a reception failure of the at least one data packet. In some embodiments, the failure information may be a status report. If the network device 220 does not receive the failure information from the terminal device 210-1, the network device 220 may determine that the retransmission condition is not fulfilled.

In some embodiments, the network device 220 may determine 4015 a transmitting window. The transmitting window may be larger than the receiving window maintained at each receiving terminal device. In some embodiments, if 12 bit SN is used, the size of a receiving window may be 2048. Alternatively, if 18 bits SN is used, the size of the receiving window may be 131072. In some embodiments, the transmitting window for the first radio bearer may be $2^{rlc-SN-SizeDL}$-X, where X is no smaller than 0 and rlc-SN-SizeDL represents the sequence number.

In some embodiments, the terminal device 210-1 may transmit 4020 a status report to the network device 220. The status report may be used to request retransmission for one or more data packets with the sequence number SN. If the SN falls into the transmitting window, the network device 220 may retransmit 4025 the one or more data packets.

Alternatively, if the SN falls outside the transmitting window, the network device 220 may skip the retransmission of the one or more data packets. In some embodiments, the network device 220 may transmit 4030 an indication to release the first radio bearer. The terminal device 210-1 may release 4035 the first radio bearer based on the indication.

In some example embodiments, the network device 220 may transmit 4040 an indication to switch from the first radio bearer to a second radio bearer. For example, the second radio bearer may be a PTM radio bearer. Alternatively, the second radio bearer may be a different type of radio bearer, for example, a PTP AM radio bearer, a UM radio bearer, or a PTM RLC UM radio bearer. In some embodiments, the configuration information of the second radio bearer may be transmitted to the terminal device 210-1. Alternatively, the configuration information of the second radio bearer may be pre-configured at the terminal device 210-1. The terminal device 210-1 may switch 4045 to the second radio bearer. During the switch, the terminal device 210-1 may deliver SDUs associated with the plurality of data packets to a layer above the RLC layer. In some embodiments, the RLC reception buffer may be cleared.

The network device 220 may transmit 4050 an indication to disable the ARQ operation at the terminal device 210-1. The terminal device 210-1 may disable 4055 the ARQ operation. The first radio bearer may start to operate like an UM radio bearer.

The network device 220 may transmit 4060 a discard indication to the terminal device 210-1. For example, the discard indication may indicate to discard the data packet(s) before a certain sequence number N. The sequence number N may be the lower bound of the current transmitting window. In an example embodiment, the terminal device 210-1 may update relevant state variables. For example, the parameter RX_NEXT may be updated to the value of the SN following the last in sequence completely received data packet after the discarded data packet.

The terminal device 210-1 may set 4070 one or more state variables based on the first received data packet of the plurality of data packets. For example, an initial RLC state of the first radio bearer may be set. Alternatively or in addition, an initial PDCP state of the first radio bearer may be set. In this way, it avoids problems in initiating the state variables to be zero.

In some embodiments, the terminal device 210-1 may initiate one or more of the followings based on the first received data packet: a receive state variable, a t-Reassembly state variable, a maximum status transmit state variable, a highest received state variable, a Unacknowledged Mode (UM) receive state variable, a UM t-Reassembly state variable, or a UM receive state variable. In other embodiments, one or more of the followings may be initiated based on the first received data packet: a first state variable indicating a count value of a next PDCP Service Data Unit (SDU) expected to be received, or a second state variable indicating a count value of the first PDCP SDU not delivered to a layer upper than the PDCP layer.

Example Method

Figure 5:
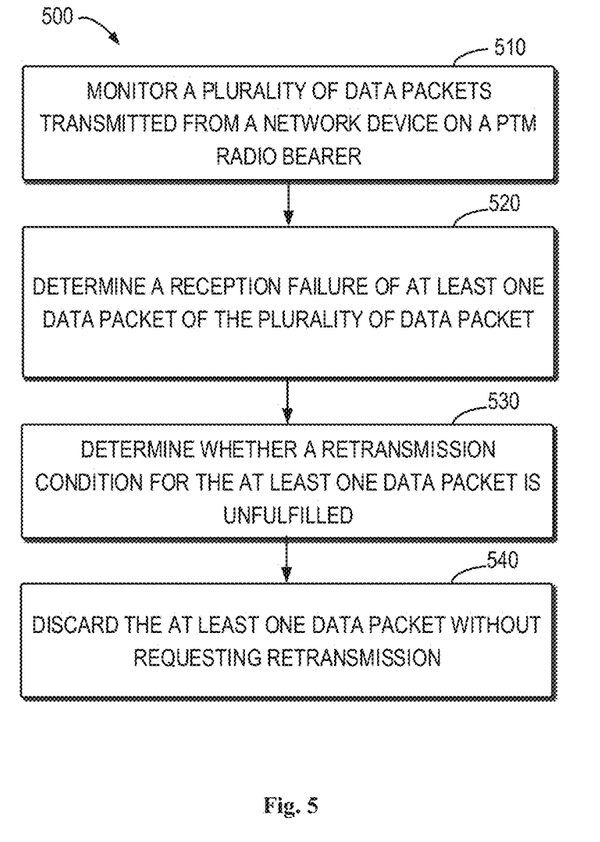
FIG. 5 illustrates a flowchart of an example method according to some embodiments of the present disclosure.

FIG. 5 illustrates a flowchart of an example method 500 according to some embodiments of the present disclosure. The method 500 can be performed by the terminal device 110 as shown in FIG. 2. It is to be understood that the method 500 may include additional blocks not shown and/or may omit some blocks as shown, and the scope of the present disclosure is not limited in this regard. For the purpose of discussion, the method 500 will be described from the perspective of the terminal device 110 with reference to FIG. 2.

At block 510, the terminal device 210-1 monitors a plurality of data packets received from a network device on a first radio bearer. For example, the RLC PDUs may be transmitted on the first radio bearer. Alternatively or in addition, the RLC SDUs may be transmitted on the first radio bearer. The first radio bearer may be a PTM radio bearer.

At block 520, the terminal device 210-1 determines a reception failure of at least one data packet of the plurality of data packets. At block 530, the terminal device 210-1 determines whether a retransmission condition for the at least one data packet is unfulfilled. If the reception failure occurs, the terminal device 210-1 determines 3012 whether a retransmission condition for the at least one data packet is unfulfilled. For example, the terminal device 210-1 may compare a number of reception failures of the at least one data packet with a threshold number. If the number of reception failures is below the threshold number, the retransmission condition is fulfilled. Alternatively, if the number of reception failures exceeds the threshold number, the retransmission condition is unfulfilled.

In some embodiments, the terminal device 210-1 may update a receiving window based on a SN of a next data packet following the plurality of data packets. For example, the receiving window may be bounded by [RX_NEXT_HIGHEST-AM_WINDOW_SIZE, RX_NEXT_HIGHTEST], where RX_NEXT_HIGHEST represents value of the SN following the SN of the RLC SDU with the highest SN among received RLC SDUs. If the at least one data packet falls outside the receiving window, the retransmission condition is unfulfilled. Alternatively, if the at least one data packet falls within the receiving window, the retransmission condition is fulfilled. In this way, the receiving window keeps updating regardless of the lost data packet, thereby avoiding requesting the retransmission of the lost data packet.

At block 540, in accordance with a determination that the retransmission condition is unfulfilled, the terminal device 210-1 discards the at least one data packet without requesting retransmission. In some embodiments, for a give MBS session transmitting over the first radio bearer, if the reception of one or more RLC PDUs/SDUs fails consecutively, the terminal device 210-1 may discard the missing RLC PDU(s)/SDU(s) without requesting retransmission of the same RLC PDU(s)/SDU(s). In another embodiment, a RLC SDU may comprise multiple RLC PDUs. The reception of one RLC SDU fails due to the missing of one RLC PDU. In this situation, if the retransmission condition is unfulfilled, the terminal device 210-1 may discard the whole RLC SDU including those RLC PDUs that has been received so far. For example, as mentioned above, if the number of reception failures exceeds the threshold number, the at least one data packet may be discarded by the terminal device 210-1.

In other embodiments, of the at least one data packet falls outside the receiving window, the at least one data packet may be discarded by the terminal device 210-1. For example, the terminal device 210-1 may discard the data packet with the SN of the data packet smaller than RX_NEXT_HIGHEST-AM_WINDOW_SIZE while still in the buffer. In some embodiments, the network device 220 may transmit an indication to the terminal device 210-1 to discard the lost data packet before the SN "X."

In an example embodiment, the terminal device 210-1 may update relevant state variables. For example, the parameter RX_NEXT may be updated to the value of the SN following the last in sequence completely received data packet after the discarded data packet.

The terminal device 210-1 may transmit a status report to the network device 220. In some embodiments, the status report may indicate an acknowledgment related to a set of data packets within the receiving window. In some embodiments, the acknowledgment may indicate an ACK related to the set of data packets. Alternatively, the acknowledgement may indicate a NACK related to the set of data packets. Thus, the status report of the data packet(s) out of the receiving window is not transmitted and the retransmission of the data packet(s) is skipped.

In some embodiment, the terminal device 210-1 may compare the number of reception failures of the at least one data packet with a threshold number. For example, the threshold number may be pre-configured at the terminal device 210-1. Alternatively, the network device 220 may transmit information indicating the threshold number to the terminal device 210-1. In an example embodiment, if the number of failures is below the threshold number, the terminal device 210-1 may request retransmitting the at least one data packet. In this way, it avoids retransmitting the data packet for too many times.

Alternatively, if the number of reception failures exceeds the threshold number, failure information indicating the reception failure may be generated. The terminal device 210-1 may transmit the failure information to the network device 220. In some embodiments, the failure information may be transmitted via RRC signaling. Therefore, it avoids UE keeps sending RLC status report requesting retransmission for the same missed/lost RLC SDU or PDU.

In other embodiments, if the number of reception failures exceeds the threshold number, the terminal device 210-1 may release the first radio bearer. Alternatively, the first radio bearer may be released after the terminal device 210-1 receives an indication from the network device 220 to release the first radio bearer.

In some embodiments, the terminal device 210-1 may switch from the first radio bearer to a second radio bearer based on a configuration information. For example, if the number of reception failures exceeds the threshold number, the terminal device 210-1 may switch from the first radio bearer to the second radio bearer. Alternatively, the first radio bearer may be switched to the second radio bearer if the terminal device 210-1 receives an indication to switch. In some embodiments, the configuration of the second radio bearer may be pre-configured at the terminal device 210-1. Alternatively, the network device 220 may transmit the configuration information of the second radio bearer to the terminal device 210-1. In other embodiments, the terminal device 210-1 may request the configuration information of the second radio bearer from the network device 220. During the switch, the terminal device 210-1 may deliver SDUs associated with the plurality of data packets to a layer above than the RLC layer, for example, to PDCP layer. In some embodiments, the RLC reception buffer may be cleared.

In an example embodiment, the network device 220 may transmit to the terminal device 210-1 an indication to disable an ARQ operation. The terminal device 210-1 may disable the ARQ operation based on this indication. In this way, it avoids UE keeps requesting retransmission for the same missed/lost RLC PDU.

The terminal device 210-1 may set one or more state variables based on the first received data packet of the plurality of data packets. For example, an initial RLC state of the first radio bearer may be set. Alternatively or in addition, an initial PDCP state of the first radio bearer may be set. In this way, it avoids problems in initiating the state variables to be zero.

In some embodiments, the terminal device 210-1 may initiate one or more of the followings based on the first received data packet: a receive state variable, a t-Reassembly state variable, a maximum status transmit state variable, a highest received state variable, a Unacknowledged Mode (UM) receive state variable, a UM t-Reassembly state variable, or a UM receive state variable. In other embodiments, one or more of the followings may be initiated based on the first received data packet: a first state variable indicating a count value of a next PDCP Service Data Unit (SDU) expected to be received, or a second state variable indicating a count value of the first PDCP SDU not delivered to a layer upper than the PDCP layer.

Figure 6:
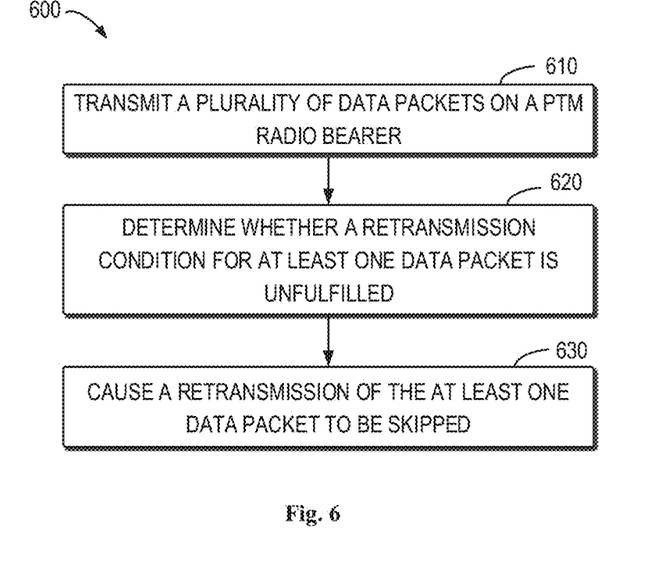
FIG. 6 illustrates a flowchart of an example method according to some embodiments of the present disclosure.

FIG. 6 illustrates a flowchart of an example method 600 according to some embodiments of the present disclosure. The method 600 can be performed by the network device 220 as shown in FIG. 2. It is to be understood that the method 600 may include additional blocks not shown and/or may omit some blocks as shown, and the scope of the present disclosure is not limited in this regard. For the purpose of discussion, the method 600 will be described from the perspective of the network device 220 with reference to FIG. 2.

At block 610, the network device 220 transmits, to the terminal device 210-1, a plurality of data packets on a first radio bearer. For example, the network device 220 may transmit RLC PDUs on the first radio bearer. Alternatively or in addition, the RLC SDUs may be transmitted on the first radio bearer. In some embodiments, the first radio bearer may be a PTM radio bearer.

At block 620, the network device 220 determines whether a retransmission condition for at least one data packet in the plurality of data packets is unfulfilled. In an example embodiment, the network device 220 may monitor failure information for a predetermined duration. The failure information may indicate a reception failure of the at least one data packet. In some embodiments, the failure information may be a status report. If the network device 220 does not receive the failure information, the network device 220 may determine that the retransmission condition is not fulfilled.

In some embodiments, the network device 220 may determine 4015 a transmitting window. The transmitting window may be larger than the receiving window maintained at each receiving terminal device. In some embodiments, if 12 bit SN is used, the size of a receiving window may be 2048. Alternatively, if 18 bits SN is used, the size of the receiving window may be 131072. In some embodiments, the transmitting window for the first radio bearer may be $2^{rlc\text{-}SN\text{-}SizeDL}$-X, where X is no smaller than 0 and rlc-SN-SizeDL represents the sequence number.

In some embodiments, the network device 220 may receive a status report from the terminal device 210-1. The status report may be used to request retransmission for one or more data packets with the sequence number SN. If the SN falls into the transmitting window, it means that the retransmission condition is fulfilled. Alternatively, if the SN falls outside the transmitting window, it means that the retransmission condition is unfulfilled.

At block 630, if the retransmission condition is unfulfilled, the network device 220 causes a retransmission of the at least one data packet to be skipped. In some embodiments, the network device 220 may transmit an indication to release the first radio bearer.

In some example embodiments, the network device 220 may transmit an indication to switch from the first radio bearer to a second radio bearer. For example, the second radio bearer may be a PTM radio bearer. Alternatively, the second radio bearer may be a different type of radio bearer, for example, a PTP AM radio bearer, a UM radio bearer, or a PTM RLC UM radio bearer. In some embodiments, the configuration information of the further radio bearer may be transmitted to the terminal device 210-1. Alternatively, the configuration information of the second radio bearer may be pre-configured at the terminal device 210-1.

In an example embodiment, the network device 220 may transmit indication to disable the ARQ operation at the terminal device 210-1. Alternatively or in addition, the network device 220 may transmit 4060 a discard indication to the terminal device 210-1. For example, the discard indication may indicate to discard the data packet(s) before a certain sequence number N. The sequence number N may be the lower bound of the current transmitting window.

The following texts described specific Embodiments 1-4 of the methods as shown and illustrated in any of FIGS. 3-6.

Embodiment 1

In this embodiment, for a given MBS session transmitting over a PTM radio bearer, when RLC PDU/SDU reception fails consecutively for certain times, the terminal device 210-1 may discard the missed RLC PDU/SDU without requesting retransmission for the same RLC PDU/SDU. For example, the PTM radio bearer receiving window may be bounded by [RX_NEXT_HIGHEST-AM_WINDOW_SIZE, RX_NEXT_HIGHTEST], where RX_NEXT_HIGHEST represents value of the SN following the SN of the RLC SDU with the highest SN among received RLC SDUs. The terminal device 210-1 may keep updating RX_NEXT_HIGHEST value when receiving new RLC SDUs. The terminal device 210-1 may discard RLC SDU segments with SN<RX_NEXT_HIGHEST-AM_WINDOW_SIZE while still in the buffer.

In addition, the terminal device 210-1 may update the relevant state variables. For example, the RX_NEXT parameter may be updated to the value of the SN following to the last sequence completely received RLC SDU after the discarded RLC SDU. In the RLC status report sent to the network device 220, the terminal device 210-1 may only indicate ACK/NACK for RCL SDUs within the receiving window.

In another example, the terminal device 210-1 may be configured with a maximum number reception failure for a single RLC PDU/SDU. When the reception for one RLC PDU/SDU keeps failing for N times larger than the maximum number, the terminal device 210-1 may release the current PTM radio bearer. Alternatively, the terminal device 210-1 may switch to another radio bearer configured by the network device 220. In other embodiments, the terminal device 210-1 may generate a failure information RRC message and transmit to the network device 220 indicating the RLC reception failure.

In another example, after the RLC PDU/SDU transmission in downlink fails consecutively, the network device 220 may instruct the terminal device 210-1 to switch from a PTM AM radio bearer to another type of radio bearer (for example, PTP RLC AM or UM DRB, or PTM RLC UM DRB). The network device 220 may also provide the corresponding radio bearer configuration. During the radio bearer switch, the terminal device 210-1 may reassemble and deliver RLC SDUs to upper layer, clear its RLC reception buffer. Optionally, the terminal device 210-1 may release the old PTM RLC AM radio bearer.

Alternatively, the network device 220 may transmit a command to the terminal device 210-1 (per dedicated RRC signaling or MAC control element (CE) or RLC header) to disable ARQ operation. In other embodiments, the network device 220 may indicate to the terminal device 210-1 to discard the missing/lost RLC SDU/PDU before SN equals to X per e.g. RLC control PDU. The terminal device 210-1 may update relevant state variables. For example, RX_NEXT parameter may be updated to the value of the SN following the last in-sequence completely received RLC SDU after the discarded RLC SDU.

Embodiment 2

In this embodiment, when operating PTM RLC AM transmission in DL, the network device 220 may maintain a transmitting window larger than the receiving window size maintained in each receiving terminal device. For example, the transmitting window size may be $2^{rlc\text{-}SN\text{-}SizeDL}$-X, where X is a suitable integer number. The transmitting window may be larger than the receiving window of the terminal device 210-1.

If the network device 220 receives a status report from the terminal device 210-1 requesting retransmission for one or multiple RLC PDU/PDUs with the sequence number SN, the network device 220 may determine whether the sequence number SN is within the transmitting window. If the sequence number SN falls into the transmitting window, the network device 220 may retransmit the corresponding RLC PDU/PDUs.

Alternatively, if the sequence number SN falls outside the transmitting window, the network device 220 may instruct the terminal device 210-1 to switch from a PTM radio bearer to another type of radio bearer (e.g. PTP RLC AM or UM DRB, or PTM RLC UM DRB) and provide the corresponding radio bearer configuration. During the radio bearer switch, the terminal device 210-1 may reassemble and deliver RLC SDUs to upper layer and clear its RLC reception buffer. Optionally, the terminal device 210-1 may release the old PTM RLC AM radio bearer. Alternatively, the network device 220 may transmit a command to the terminal device 210-1 (per dedicated RRC signaling or MAC control element (CE) or RLC header) to disable ARQ operation. In other embodiments, the network device 220 may indicate to the terminal device 210-1 to discard the missing/lost RLC SDU/PDU before SN=X per e.g. RLC control PDU. The terminal device 210-1 may update relevant state variables. For example, RX_NEXT parameter may be updated to the value of the SN following the last in-sequence completely received RLC SDU after the discarded RLC SDU.

Embodiment 3

In this embodiment, when the terminal device 210-1 is configured with a PTM radio bearer, the RLC state variables may be initialized based on the first received data packet in the plurality of data packets.

The receiving side of each AM RLC entity shall maintain the following state variables:

(a) RX_Next—Receive state variable. This state variable holds the value of the SN following the last in-sequence completely received RLC SDU, and it serves as the lower edge of the receiving window. It is initially set to 0, and is updated whenever the AM RLC entity receives an RLC SDU with SN=RX_Next. For PTM SRB/DRB, it is initially set to the SN of first received Acknowledged Mode Data PDU (AMD PDU) containing an SN.

(b) RX_Next_Status_Trigger—t-Reassembly state variable. This state variable holds the value of the SN following the SN of the RLC SDU which triggered t-Reassembly.

(c) RX_Highest_Status—Maximum STATUS transmit state variable. This state variable holds the highest possible value of the SN which can be indicated by "ACK_SN" when a STATUS PDU needs to be constructed. It is initially set to 0. For PTM SRB/DRB, it is initially set to the SN of first received AMD PDU containing an SN.

(d) RX_Next_Highest—Highest received state variable. This state variable holds the value of the SN following the SN of the RLC SDU with the highest SN among received RLC SDUs. It is initially set to 0. For PTM SRB/DRB, it is initially set to the SN of first received AMD PDU containing an SN.

Each receiving UM RLC entity shall maintain the following state variables:

(a) RX_Next_Reassembly—UM receive state variable. This state variable holds the value of the earliest SN that is still considered for reassembly. It is initially set to 0. For groupcast and broadcast of NR sidelink communication, it is initially set to the SN of the first received UMD PDU containing an SN. For PTM SRB/DRB, it is initially set to the SN of first received UMD PDU containing an SN.

(b) RX_Timer_Trigger—UM t-Reassembly state variable. This state variable holds the value of the SN following the SN which triggered t-Reassembly.

(c) RX_Next_Highest—UM receive state variable. This state variable holds the value of the SN following the SN of the UMD PDU with the highest SN among received UMD PDUs. It serves as the higher edge of the reassembly window. It is initially set to 0. For groupcast and broadcast of NR sidelink communication, it is initially set to the SN of the first received UMD PDU containing an SN. For PTM SRB/DRB, it is initially set to the SN of first received UMD PDU containing an SN.

Embodiment 4

In this embodiment, if the terminal device 210-1 is configured with a PTM radio bearer, the PDCP state variables are initialized based on the first received PDCP PDU.

The receiving PDCP entity shall maintain the following state variables:

(a) RX_NEXT. This state variable indicates the COUNT value of the next PDCP SDU expected to be received. The initial value is 0, except for sidelink broadcast and groupcast, and for SRBs configured with state variables continuation. For NR sidelink communication for broadcast and groupcast, the initial value of the SN part of RX_NEXT is (x+1) modulo ($2^{[sl-PDCP-SNSize]}$), where x is the SN of the first received PDCP Data PDU. For target SRB configured with state variables continuation, the initial value is the value stored in PDCP entity for the corresponding source SRB. For source SRB configured with state variables continuation, the initial value is the value stored in PDCP entity for the corresponding target SRB. For PTM SRB/DRB, it is initially set to the COUNT value of the first received PDCP PDU.

(b) RX_DELIV. This state variable indicates the COUNT value of the first PDCP SDU not delivered to the upper layers, but still waited for. The initial value is 0, except for sidelink broadcast and groupcast, and for SRBs configured with state variables continuation. For NR sidelink communication for broadcast and groupcast, the initial value of the SN part of RX_DELIV is $(x-0.5 \times 2^{[sl-PDCP-SN-Size-1]})$ modulo ($2^{[sl-PDCP-SN-Size]}$), where x is the SN of the first received. PDCP Data PDU. For target SRB configured with state variables continuation, the initial value is the value stored in PDCP entity for the corresponding source SRB. For source SRB configured with state variables continuation, the initial value is the value stored in PDCP entity for the corresponding target SRB. For PTM SRB/DRB, the initial value of HFN of RX_DELIV is set to the HFN value of the first received PDCP PDU, and the initial value of SN OF RX_DELIV is set to the $(x-0.5 \times 2^{[PDCP-SN-Size-1]})$ modulo ($2^{[PDCP-SN-Size]}$) where x is the SN of the first received PDCP PDU.

(c) RX_REORD. This state variable indicates the COUNT value following the COUNT value associated with the PDCP Data PDU which triggered t-Reordering. For target SRB configured with state variables continuation, the initial value is the value stored in PDCP entity for the corresponding source SRB. For source SRB configured with state variables continuation, the initial value is the value stored in PDCP entity for the corresponding target SRB.

Example Apparatus

Figure 7:
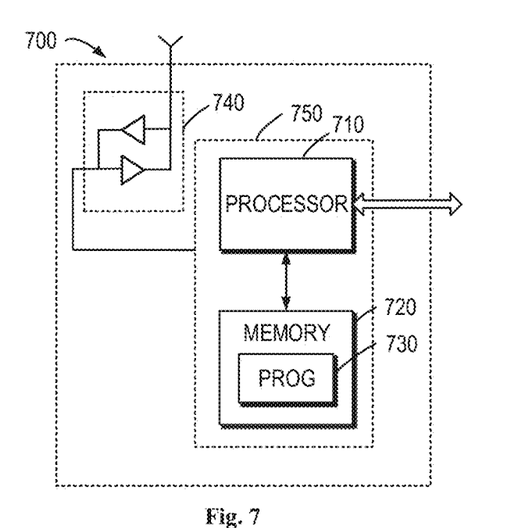
FIG. 7 illustrates a simplified block diagram of an apparatus that is suitable for implementing embodiments of the present disclosure.

FIG. 7 is a simplified block diagram of an apparatus 700 that is suitable fix implementing embodiments of the present disclosure. The apparatus 700 can be considered as a further example implementation of the terminal device 110, the network device 120, or the network device 130 as shown in FIG. 1. Accordingly, the apparatus 700 can be implemented at or as at least a part of the terminal device 110, the network device 120, or the network device 130.

As shown, the apparatus 700 includes a processor 710, a memory 720 coupled to the processor 710, a suitable transmitter (TX) and receiver (RX) 740 coupled to the processor 710. The memory 710 stores at least a part of a program 730. The TX/RX 740 is for bidirectional communications. The TX/RX 740 is coupled to at least one antenna to facilitate communication, though, in practice, an Access Node mentioned in this application may have several antennas. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

A program 730 is assumed to include program instructions that, when executed by the associated processor 710, enable the apparatus 700 to operate in accordance with the embodiments of the present disclosure, as discussed herein with reference to FIGS. 2-6. The embodiments herein may be implemented by computer software executable by the processor 710 of the apparatus 700, or by hardware, or by a combination of software and hardware. The processor 710 may be configured to implement various embodiments of the present disclosure. Furthermore, a combination of the processor 710 and memory 710 may form processing means 750 adapted to implement various embodiments of the present disclosure.

The memory 710 may be of any type suitable to the local technical network and may be implemented using any suitable data storage technology, such as a non-transitory computer readable storage medium, semiconductor-based memory devices, magnetic memory devices and systems, optical memory devices and systems, fixed memory and removable memory, as non-limiting examples. While only one memory 710 is shown in the apparatus 700, there may be several physically distinct memory modules in the apparatus 700. The processor 710 may be of any type suitable to the local technical network, and may include one or more of general purpose computers, special purpose computers, microprocessors, digital signal processors (DSPs) and processors based on multicore processor architecture, as non-limiting examples. The apparatus 700 may have multiple processors, such as an application specific integrated circuit chip that is slaved in time to a clock which synchronizes the main processor.

In some embodiments, an apparatus for performing the method 500 (for example, the terminal device 210-1) may comprise respective means for performing the corresponding steps in the method 500. These means may be implemented in any suitable manners. For example, it can be implemented by circuitry or software modules.

In some embodiments, the apparatus comprises means for monitoring a plurality of data packets transmitted from a network device on a first radio bearer; means for determining a reception failure of at least one data packet of the plurality of data packets; means for determining whether a retransmission condition for the at least one data packet is unfulfilled; and means for in accordance with a determination that the retransmission condition is unfulfilled, discarding the at least one data packet without requesting retransmission.

In some embodiments, the means for determining whether the retransmission condition for the at least one data packet is unfulfilled comprises: means for updating a receiving window for the plurality of data packets based on a sequence number of a next data packet following the plurality of data packets; and means for in accordance with a determination that the at least one data packet is outside the receiving window, determining that the retransmission condition is unfulfilled.

In some embodiments, the apparatus further comprises means for transmitting a status report to the network device;

the status report indicating an acknowledgment related to a set of data packets received within the receiving window.

In some embodiments, the apparatus further comprises means for comparing a number of reception failures of the at least one data packet with a threshold number; means for in accordance with a determination that the number of reception failures exceeds the threshold number, generating failure information; and means for transmitting the failure information to the network device.

In some embodiments, the apparatus further comprises means for comparing a number of reception failures of the at least one data packet with a threshold number; means for in accordance with a determination that the number of reception failures exceeds the threshold number, performing at least one of: releasing the first radio bearer; or switching from the first radio bearer to a second radio bearer.

In some embodiments, the apparatus further comprises means for receiving, from the network device, a configuration information of a second radio bearer; means for receiving, from the network device, an indication to switch from the first radio bearer to the second radio bearer; and means for switching from the first radio bearer to the second radio bearer based on the configuration information.

In some embodiments, the means for switching from the first radio bearer to the second radio bearer comprises: means for delivering Service Data Units (SDUs) associated with the plurality of data packets to a layer above a Radio Link Control (RLC) layer; and means for clearing a RLC reception buffer.

In some embodiments, the apparatus further comprises means for receiving from the network device an indication to disable an Automatic Repeat (ARQ) operation at the terminal device.

In some embodiments, the means for setting, based on a first received data packet in the plurality of data packets, at least one of: an initial Radio Link Control (RLC) state of the first radio bearer or an initial Packet Data Convergence Protocol (PDCP) state of the first radio bearer.

In some embodiments, the initial RLC state of the first radio bearer comprises at least one of: a receive state variable, a t-Reassembly state variable, a maximum status transmit state variable, a highest received state variable, a Unacknowledged Mode (UM) receive state variable, a UM t-Reassembly state variable, or a UM receive state variable.

In some embodiments, the initial PDCP state of the first radio bearer comprises at least one of: a first state variable indicating a count value of a next PDCP Service Data Unit (SDU) expected to be received, or a second state variable indicating a count value of the first PDCP SDU not delivered to a layer above the PDCP layer.

In some embodiments, an apparatus for performing the method 600 (for example, the network device 220) may comprise respective means for performing the corresponding steps in the method 300. These means may be implemented in any suitable manners. For example, it can be implemented by circuitry or software modules.

In some embodiments, the apparatus comprises means for transmitting, to a terminal device, a plurality of data packets on a first radio bearer; means for determining whether a retransmission condition for at least one data packet of the plurality of data packets is unfulfilled; and means for in accordance with a determination that the retransmission condition is unfulfilled, causing a retransmission of the at least one data packet to be skipped.

In some embodiments, the apparatus further comprises means for determining a transmitting window for the plurality of data packets; means for receiving, from the terminal device, failure information indicating a reception failure of the at least one data packet; and the means for determining whether the retransmission condition for at least one data packet of the plurality of data packet is unfulfilled comprises: means for in accordance with a determination that a sequence number of the at least one data packet falls within the transmitting window, determining that the retransmission condition is fulfilled; or means for in accordance with a determination that the sequence number of the at least one data packet falls outside the transmitting window, determining that the retransmission condition is unfulfilled.

In some embodiments, the means for causing the retransmission of the at least one data packet to be skipped comprises: means for in accordance with a determination that the sequence number of the at least one data packet falls out of the transmitting window, causing a retransmission of the at least one data packet to be skipped.

In some embodiments, the apparatus further comprises means for in accordance with a determination that the sequence number of the at least one data packet falls within the transmitting window, retransmitting the at least one data packet on the first radio bearer.

In some embodiments, the means for determining whether the retransmission condition for at least one data packet in the plurality of data packet is unfulfilled comprises: means for monitoring, for a predetermined duration, failure information indicating a reception failure of the at least one data packet; and means for in accordance with a determination that the reception failure indicated in the failure information, determining that the retransmission condition is unfulfilled.

In some embodiments, the apparatus further comprises means for in accordance with a determination that the retransmission condition is unfulfilled, transmitting, to the terminal device, a configuration information of a second radio bearer; and means for transmitting, to the terminal device, an indication to switch from the first radio bearer to the second radio bearer.

In some embodiments, the apparatus further comprises means for in accordance with a determination that the retransmission condition is unfulfilled, transmitting to the terminal device an indication to disable an automatic repeat request (ARQ) operation at the terminal device.

In some embodiments, the apparatus further comprises means for in accordance with a determination that the retransmission condition is unfulfilled, transmitting, to the terminal device, a discard indication to discard the at least one data packet.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 3-6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method performed by a terminal device, the method comprising:
    monitoring for a plurality of data packets on a point-to-multipoint radio bearer;
    receiving an initial data packet of the plurality of data packets;
    setting, based at least in part on the initial data packet of the plurality of data packets, one or more state variables corresponding to the point-to-multipoint radio bearer;
    determining a reception failure of at least one data packet of the plurality of data packets based at least in part on a transmission window associated with the one or more state variables; and
    in accordance with a condition associated with retransmission of the at least one data packet being unfulfilled, discarding the at least one data packet without requesting retransmission.

2. The method of claim 1, further comprising:
    updating a receiving window for the plurality of data packets based on a sequence number of a next data packet following the plurality of data packets; and
    in accordance with a determination that the at least one data packet is outside the receiving window, determining that the condition is unfulfilled.

3. The method of claim 2, further comprising:
    transmitting a status report indicating an acknowledgment related to a set of data packets received within the receiving window.

4. The method of claim 1, further comprising:
    comparing a number of reception failures of the at least one data packet with a threshold number;
    in accordance with a determination that the number of reception failures exceeds the threshold number, generating failure information; and
    transmitting the failure information.

5. The method of claim 1, further comprising:
    comparing a number of reception failures of the at least one data packet with a threshold number; and
    in accordance with a determination that the number of reception failures exceeds the threshold number, performing at least one of:
        releasing the point-to-multipoint radio bearer; or
        switching from the point-to-multipoint radio bearer to an additional radio bearer.

6. The method of claim 1, further comprising:
    receiving a configuration information of an additional radio bearer;
    receiving an indication to switch from the point-to-multipoint radio bearer to the additional radio bearer; and
    switching from the point-to-multipoint radio bearer to the additional radio bearer based at least in part on the configuration information.

7. The method of claim 6, wherein switching from the point-to-multipoint radio bearer to the additional radio bearer comprises:
    delivering Service Data Units (SDUs) associated with the plurality of data packets to a logic layer above a Radio Link Control (RLC) layer; and
    clearing a RLC reception buffer.

8. The method of claim 1, further comprising:
    receiving an indication to disable an Automatic Repeat reQuest (ARQ) operation at the terminal device.

9. A terminal device for wireless communication, comprising:
- at least one memory; and
- at least one processor coupled with the at least one memory and configured to cause the terminal device to:
  - monitor for a plurality of data packets on a point-to-multipoint radio bearer;
  - receive an initial data packet of the plurality of data packets;
  - set, based at least in part on the initial data packet of the plurality of data packets, one or more state variables corresponding to the point-to-multipoint radio bearer;
  - determine a reception failure of at least one data packet of the plurality of data packets based at least in part on a transmission window associated with the one or more state variables; and
  - in accordance with a condition associated with retransmission of the at least one data packet being unfulfilled, discard the at least one data packet without requesting retransmission.

10. The terminal device of claim 9, wherein the at least one processor is configured to cause the terminal device to:
- update a receiving window for the plurality of data packets based on a sequence number of a next data packet following the plurality of data packets; and
- in accordance with a determination that the at least one data packet is outside the receiving window, determine that the condition is unfulfilled.

11. The terminal device of claim 10, wherein the at least one processor is configured to cause the terminal device to:
- transmit a status report indicating an acknowledgment related to a set of data packets received within the receiving window.

12. The terminal device of claim 9, wherein the at least one processor is configured to cause the terminal device to:
- compare a number of reception failures of the at least one data packet with a threshold number;
- in accordance with a determination that the number of reception failures exceeds the threshold number, generate failure information; and
- transmit the failure information.

13. The terminal device of claim 9, wherein the at least one processor is configured to cause the terminal device to:
- compare a number of reception failures of the at least one data packet with a threshold number; and
- in accordance with a determination that the number of reception failures exceeds the threshold number, perform at least one of:
  - releasing the point-to-multipoint radio bearer; or
  - switching from the point-to-multipoint radio bearer to an additional radio bearer.

14. The terminal device of claim 9, wherein the at least one processor is configured to cause the terminal device to:
- receive a configuration information of an additional radio bearer;
- receive an indication to switch from the point-to-multipoint radio bearer to the additional radio bearer; and
- switch from the point-to-multipoint radio bearer to the additional radio bearer based on the configuration information.

15. The terminal device of claim 14, wherein to switch from the point-to-multipoint radio bearer to the additional radio bearer, the at least one processor is further configured to cause the terminal device to:
- deliver Service Data Units (SDUs) associated with the plurality of data packets to a logic layer above a Radio Link Control (RLC) layer; and
- clear a RLC reception buffer.

16. The terminal device of claim 9, wherein the at least one processor is configured to cause the terminal device to:
- receive an indication to disable an Automatic Repeat reQuest (ARQ) operation at the terminal device.

17. A network entity (NE) for wireless communication, comprising:
- at least one memory; and
- at least one processor coupled with the at least one memory and configured to cause the NE to:
  - transmit, to a terminal device, a plurality of data packets on a point-to-multipoint radio bearer, wherein one or more state variables corresponding to the point-to-multipoint radio bearer are set based at least in part on an initial data packet of the plurality of data packets; and
  - in accordance with a condition associated with retransmission of at least one data packet of the plurality of data packets being unfulfilled, cause the retransmission of the at least one data packet to be skipped.

18. The NE of claim 17, wherein the at least one processor is configured to cause the terminal device to:
- determine a transmitting window for the plurality of data packets based at least in part on the one or more state variables;
- receive, from the terminal device, failure information indicating a reception failure of the at least one data packet; and
- in accordance with a determination that a sequence number of the at least one data packet falls within the transmitting window, determine that the condition is fulfilled; or
- in accordance with a determination that the sequence number of the at least one data packet falls outside the transmitting window, determine that the condition is unfulfilled.

19. A processor for wireless communication, comprising:
- at least one controller coupled with at least one memory and configured to cause the processor to:
  - monitor for a plurality of data packets on a point-to-multipoint radio bearer;
  - receive an initial data packet of the plurality of data packets;
  - set, based at least in part on the initial data packet of the plurality of data packets, one or more state variables corresponding to the point-to-multipoint radio bearer;
  - determine a reception failure of at least one data packet of the plurality of data packets based at least in part on a transmission window associated with the one or more state variables; and
  - in accordance with a condition associated with retransmission of the at least one data packet being unfulfilled, discard the at least one data packet without requesting retransmission.

20. The processor of claim 19, wherein the at least one controller is configured to cause the processor to:
- update a receiving window for the plurality of data packets based on a sequence number of a next data packet following the plurality of data packets; and
- in accordance with a determination that the at least one data packet is outside the receiving window, determine that the condition is unfulfilled.

* * * * *